US009741486B2

(12) United States Patent
Allaert et al.

(10) Patent No.: US 9,741,486 B2
(45) Date of Patent: Aug. 22, 2017

(54) DIFFERENTIAL MODE AND COMMON MODE CHOKE

(71) Applicant: Schneider Toshiba Inverter Europe SAS, Pacy sur Eure (FR)

(72) Inventors: Yves-Laurent Allaert, Vernon (FR); Cyrille Planque, Pacy sur Eure (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 108 days.

(21) Appl. No.: 14/217,697

(22) Filed: Mar. 18, 2014

(65) Prior Publication Data
US 2014/0286068 A1    Sep. 25, 2014

(30) Foreign Application Priority Data

Mar. 20, 2013 (FR) ..................... 13 52471

(51) Int. Cl.
*H01F 30/06* (2006.01)
*H01F 3/14* (2006.01)
(Continued)

(52) U.S. Cl.
CPC ............. *H01F 30/06* (2013.01); *H01F 3/14* (2013.01); *H01F 37/00* (2013.01); *H02M 7/537* (2013.01);
(Continued)

(58) Field of Classification Search
CPC ........ H02M 5/45; H02M 30/06; H02M 7/537; H01F 3/14; H01F 27/24; H01F 2017/0093; H01F 2038/46
(Continued)

(56) References Cited

U.S. PATENT DOCUMENTS 6,459,739 B1 * 10/2002 Vitenberg ............... H04B 3/30
  333/12
2005/0068144 A1   3/2005 Miettinen
(Continued)

FOREIGN PATENT DOCUMENTS

EP   1 519 392 A1   3/2005
EP   2 068 430 A2   6/2009
JP   11-204355      7/1999

OTHER PUBLICATIONS

JP-11204355A; Sawae Takao; Jul. 30, 1999—(Translation Document).*
French Preliminary Search Report issued Nov. 12, 2013, in Patent Application No. FR 1352471, filed Mar. 20, 2013.

*Primary Examiner* — Fred E Finch, III
*Assistant Examiner* — Rafael O De Leon Domenech
(74) *Attorney, Agent, or Firm* — Oblon, McClelland, Maier & Neustadt, L.L.P.

(57) ABSTRACT

The invention relates to a differential mode and common mode choke comprising:
  a ferromagnetic core comprising three branches (1, 2, 3) extending between a bottom part (5) and a top part (4),
  a first coil (b1) wound around the first lateral branch (1),
  a second coil (b3) wound around the second lateral branch (3),
  the first lateral branch (1) being separated from the top part (4) by a first air gap (e1) and from the bottom part (5) by a second air gap (e10),
  the second lateral branch (3) being separated from the top part (4) by a first air gap (e3) and from the bottom part (5) by a second air gap (e30),
  the central branch (2) being separated from the top part (4) by a first air gap (e2) and from the bottom part (5) by a second air gap (e20).

10 Claims, 2 Drawing Sheets

(51) Int. Cl.
*H01F 37/00* (2006.01)
*H02M 7/537* (2006.01)
*H01F 38/42* (2006.01)
*H01F 27/24* (2006.01)
*H02M 5/45* (2006.01)
*H01F 17/00* (2006.01)

(52) U.S. Cl.
CPC ...... *H01F 27/24* (2013.01); *H01F 2017/0093* (2013.01); *H01F 2038/426* (2013.01); *H02M 5/45* (2013.01)

(58) Field of Classification Search
USPC .................................... 336/178, 184, 212
See application file for complete search history.

(56) References Cited

U.S. PATENT DOCUMENTS

| | | | |
|---|---|---|---|
| 2007/0211501 A1* | 9/2007 | Zargari | H02M 5/4585 363/39 |
| 2008/0094159 A1* | 4/2008 | Sodo | H02M 1/126 336/5 |
| 2009/0140829 A1 | 6/2009 | Sodo | |
| 2013/0234526 A1* | 9/2013 | Jacobson | H01F 38/00 307/104 |

* cited by examiner

DIFFERENTIAL MODE AND COMMON MODE CHOKE

TECHNICAL FIELD OF THE INVENTION

The present invention relates to a choke organized to filter in differential mode and in common mode.

PRIOR ART

As is known, a power converter comprises a DC power supply bus supplied by a DC voltage source, a bus capacitor intended to maintain the DC voltage of the bus at a constant value and an inverter module intended to convert the DC voltage supplied via the bus into a variable voltage intended for an electrical load. In a power converter of variable speed drive type, the DC voltage source comprises a rectifier module connected to an electrical distribution network and intended to rectify the AC voltage supplied by the network and to apply a DC voltage to the DC power supply bus.

It is also known practice to connect a choke to the DC power supply bus in order to act on the THDi ("Total Harmonic Distortion of Current") and the PWHD ("Partial Weighted Harmonic Distortion").

The THDi corresponds to the current mode harmonic distortion ratio and therefore represents the RMS value of the harmonics related to the RMS value of the fundamental current. For its part, the PWHD introduces a weighting giving more weight to the high-frequency harmonics, more particularly those in the ranks 14 to 40.

It is known from the prior art to produce a coupled choke making it possible to filter in differential mode and in common mode (FIGS. 1A and 1B). This type of choke comprises a ferromagnetic core comprising a top part 40 and three branches 10, 20, 30 interlinked by a bottom part 50, each of the three branches being separated from the top part by an air gap. A first coil b10 is wound around one of the lateral branches and a second coil b30 is wound around the other lateral branch, the central branch remaining bare. These choke architectures are often produced by stacking magnetic plates of standard size. If the standard magnetic plates are those of a three-phase choke, the three branches are then identical and the three air gaps are also identical (FIG. 1A). It follows therefrom that the common mode filtering characteristics of this choke are entirely set by its differential mode filtering characteristics. Moreover, if the standard magnetic plates employed are those of a single-phase choke, the central branch is of a size that is disproportionate compared to the size of the two lateral branches (FIG. 1B).

Consequently, designing a ferromagnetic core in which the sizes of the different branches are optimized, by independently adjusting the common mode filtering and the differential mode filtering, demands the use of a material that can be machined or that can be cast.

The document JP H11 204355A describes, for its part, a solution that makes it possible to merge two chokes into just one in order to profit from the magnetic circuit available in the system.

The aim of the invention is to propose a choke that allows for common mode filtering and differential mode filtering, by overcoming the constraints of standard volumes available on the market. The choke of the invention will notably be able to be manufactured by stacking magnetic plates.

This aim is achieved by a differential mode and common mode choke comprising:

- a ferromagnetic core comprising three branches extending between a bottom part and a top part, said three branches comprising a first lateral branch, a second lateral branch and a central branch,
- a first coil wound around the first lateral branch,
- a second coil wound around the second lateral branch, said choke being characterized in that:
- the first lateral branch is separated from the top part by a first air gap and from the bottom part by a second air gap,
- the second lateral branch is separated from the top part by a first air gap and from the bottom part by a second air gap,
- the central branch is separated from the top part by a first air gap and from the bottom part by a second air gap,
- said first coil (b1) has a first inductance value,
- said second coil (b2) has a second inductance value, equal to the first inductance value.

According to a particular feature, the first lateral branch and the second lateral branch are manufactured by stacking magnetic plates or by machining or casting magnetic material.

According to another particular feature, the central branch is manufactured by stacking magnetic plates or by machining or casting magnetic material.

According to another particular feature, the top part and the bottom part are manufactured by stacking magnetic plates or by machining or casting magnetic material.

The invention also relates to a power converter intended to be connected to an electrical load and comprising:

- a DC power supply bus provided with a first power supply line and a second power supply line,
- a bus capacitor connected to the first power supply line and to the second power supply line and intended to keep a DC voltage constant on the DC power supply bus,
- an inverter module connected to the DC power supply bus, downstream of the bus capacitor, and intended to convert the DC voltage into a variable voltage to be applied to the electrical load,
- a differential mode and common mode choke conforming to that defined above, the first coil being connected in series to the first power supply line and the second coil being connected in series to the second power supply line,
- said first coil is wound around the first lateral branch and connected to the first power supply line so as to be able to generate a first common mode magnetic flux in a direction in the central branch and a first differential mode magnetic flux in a direction in the central branch,
- said second coil is wound around the second lateral branch so as to be able to generate a second common mode magnetic flux identical to the first common mode magnetic flux and circulating in the central branch, in the same direction as that of the first common mode magnetic flux, and a second differential mode magnetic flux in the central branch in a direction opposite to that of the first differential mode magnetic flux, creating a zero resultant differential mode flux in the central branch.

BRIEF DESCRIPTION OF THE FIGURES

Other features and advantages will become apparent from the following detailed description in light of the appended drawings in which.

DETAILED DESCRIPTION OF AT LEAST ONE EMBODIMENT

Figure 1A:
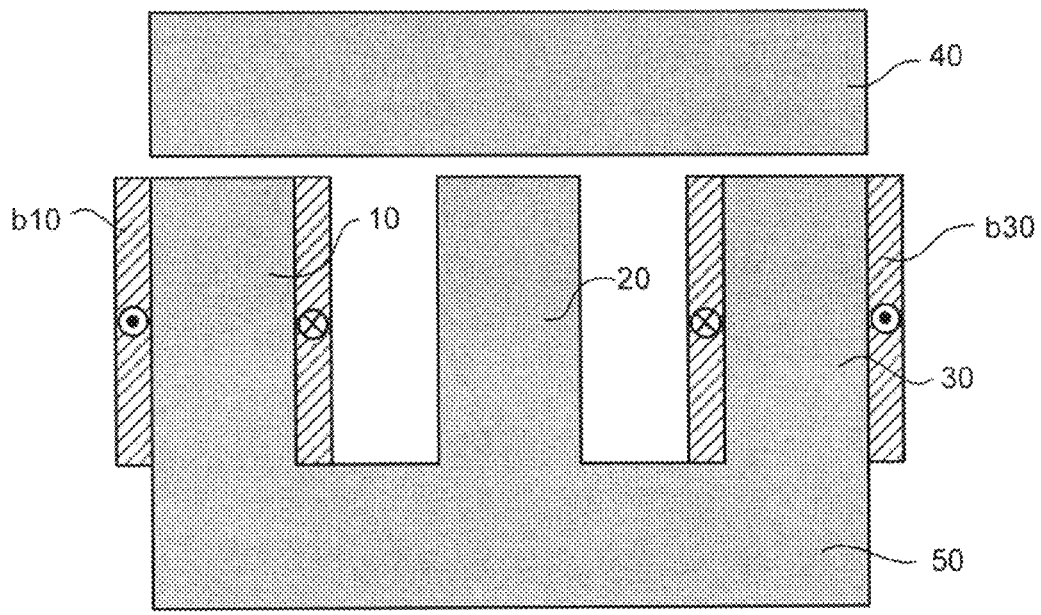
FIGS. 1A and 1B represent two choke architectures known from the prior art.
Figure 1B:
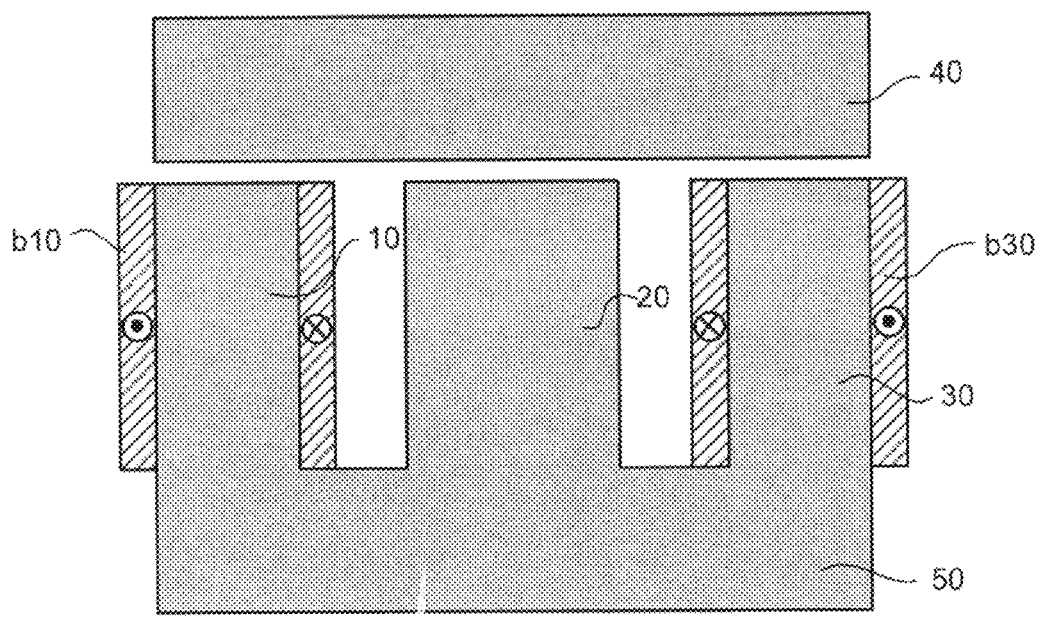

FIGS. 1A and 1B represent choke architectures known from the prior art and already described above.

Figure 2:
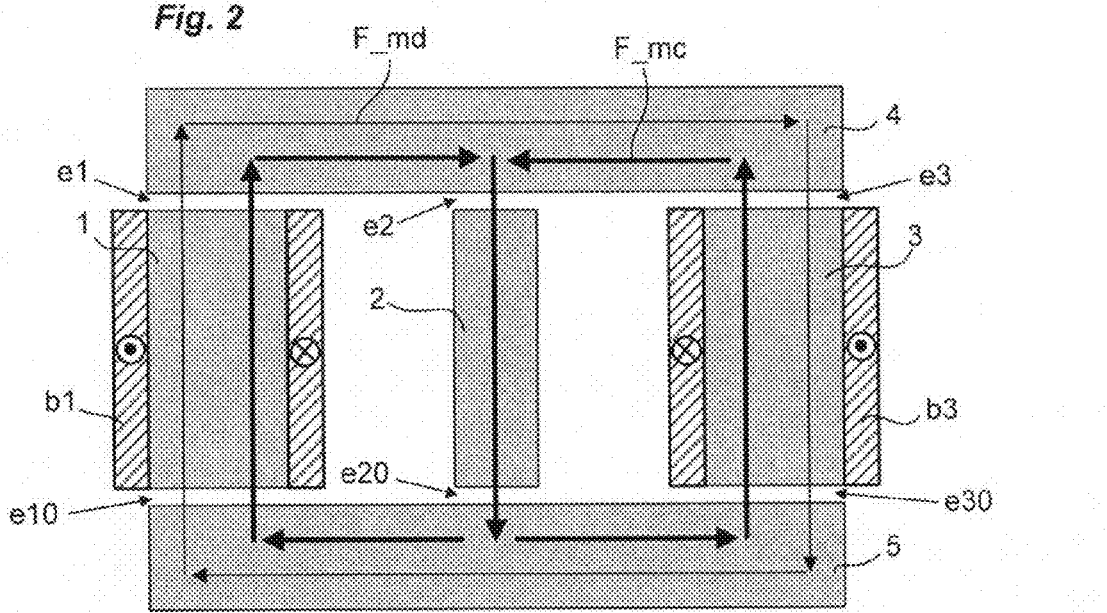
FIG. 2 represents the choke of the invention and shows the paths of the common mode and differential mode magnetic fluxes in said choke.

With reference to FIG. 2, the choke of the invention allows for a differential mode filtering and a common mode filtering. Moreover, it offers the advantage of being able to set the value of the common mode inductance independently of the value of the differential mode inductance. The choke of the invention comprises a ferromagnetic core in a FIG. 8 shape (lying down in FIG. 2). It thus comprises a top part 4, a bottom part 5 and three lateral branches 1, 2, 3 extending between the top part 4 and the bottom part 5. The three branches are thus arranged between the top part and the bottom part so as to have a first lateral branch 1, a second lateral branch 3 and a central branch 2.

Preferentially, the first lateral branch 1 and the second lateral branch 3 are identical and are therefore of one and the same thickness. The central branch 2 can have a variable size depending on the EMC (electromagnetic compatibility) requirements of the electrical appliance accommodating it. The central branch 2 can thus have a size which ranges from 0 to 100% of the size of the lateral branches 1, 3.

According to the invention, the first lateral branch 1 is separated from the top part 4 by a first air gap e1 and from the bottom part 5 by a second air gap e10.

The second lateral branch 3 is separated from the top part 4 by a first air gap e3 and from the bottom part 5 by a second air gap e30.

The central branch 2 is separated from the top part 4 by a first air gap e2 and from the bottom part 5 by a second air gap e20.

According to the invention, the three branches 1, 2, 3 are therefore independent in relation to the top 4 and bottom 5 parts. It is therefore easy to adjust their size independently and therefore set the value of the inductance of the filtering performed by each of them. Moreover, by producing them independently, it is possible to manufacture them according to different methods, minimizing the material waste. The three branches 1, 2, 3 of the choke will thus be able to be manufactured by assembling magnetic plates or by machining or casting a magnetic material. Similarly, the top part 4 and the bottom part 5 will be able to be manufactured by assembling magnetic plates or by machining or casting a magnetic material.

According to the invention, a first coil b1 is wound around the first lateral branch and a second coil b3 is wound around the second lateral branch. The central branch does not support any coil (FIG. 2). According to the invention, the first coil b1 has an inductance value equal to the inductance value of the second coil b2.

Figure 3:
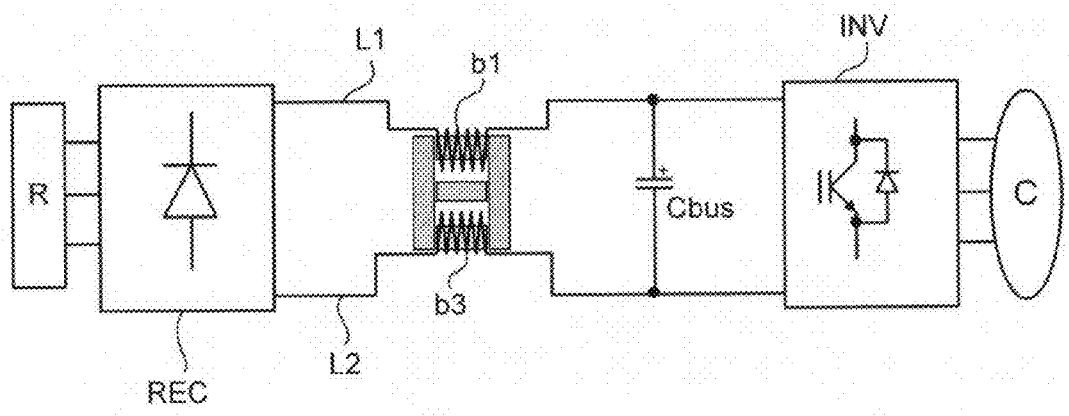
FIG. 3 represents a power converter equipped with the choke of the invention.

The choke of the invention will notably be adapted for connection to a power converter, of the variable speed drive type. Referring to FIG. 3, a power converter comprises:
  a DC power supply bus supplied by a DC voltage source.
    The DC power supply bus comprises a first power supply line L1 and a second power supply line L2. One of these two power supply lines has a positive electrical potential and the other of these two power supply lines has a negative electrical potential,
  a bus capacitor Cbus intended to keep the voltage of the bus Vbus at a constant value and connected to the first power supply line L1 and to the second power supply line L2,
  an inverter module INV connected downstream of the DC power supply bus and intended to convert the DC voltage present on the bus into a variable voltage intended for the electrical load. The inverter module INV comprises a plurality of switching arms each comprising at least two power transistors.

A power converter of variable speed drive type also comprises, upstream of the bus capacitor Cbus, a rectifier module REC connected to an electrical distribution network R and intended to rectify an AC voltage supplied by the electrical distribution network R and to apply the DC voltage to the DC power supply bus.

According to the invention, the power converter comprises a choke of the invention, connected to the DC power supply bus, upstream of the bus capacitor Cbus. The choke is connected to the DC power supply bus in such a way that its first coil b1 is connected in series to the first power supply line L1 and its second coil b3 is connected in series to the second power supply line L2.

Thus, referring to FIG. 2, the first coil b1 is wound around the first lateral branch 1 and connected to the first power supply line L1 in such a way as to be able to generate a first common mode magnetic flux in the first lateral branch and in a given direction in the central branch 2, and a first differential mode magnetic flux in a given direction in the central branch 2. The second coil is wound around the second lateral branch 3 in such a way as to be able to generate a second common mode magnetic flux identical to the first common mode magnetic flux and circulating in the second lateral branch 3 and in the central branch 2, in the same direction as that of the first common mode magnetic flux, and a second differential mode magnetic flux in the central branch 2 in a direction opposite to the direction of the first differential mode magnetic flux, creating a zero resultant differential mode flux in the central branch 2.

Referring to FIG. 2, the differential mode magnetic flux F_md thus passes through the top part 4, the second lateral branch 3, the bottom part 5 and the first lateral branch 1. The common mode flux F_mc circulates through each lateral branch towards the central branch by passing through the top part and the bottom part.

The central branch is therefore dedicated solely to the common mode and to the EMC management. Thus, the arrangement and the wiring of the coils make it possible to uncouple the common mode inductance value from the differential mode inductance value.

The particular arrangement of the choke of the invention with independent branches thus makes it possible to be able to easily set the inductance values by acting on the size of the branches and on the air gaps present between the branches and the top and bottom parts and therefore to adapt the architecture of the choke to the desired application.

The invention claimed is:

1. A differential mode and common mode choke comprising:
  a ferromagnetic core comprising three branches extending between a bottom part and a top part, said three branches comprising a first lateral branch, a second lateral branch, and a central branch;
  a first coil wound around the first lateral branch; and a second coil wound around the second lateral branch,
wherein the first lateral branch is separated from the top part by a first air gap and from the bottom part by a second air gap, the second lateral branch is separated from the top part by a third air gap and from the bottom part by a fourth air gap, the central branch does not support a coil and is separated from the top part by a fifth air gap and from the bottom part by a sixth air gap, the first lateral branch and the second lateral branch are of a same size, and the central branch, which does not support a coil and which is separated from the top part by the fifth air gap and from the bottom part by the sixth air gap, is of a different size from the size of the first lateral branch and the second lateral branch, said first coil has a first inductance value, said second coil has a second inductance value, equal to the first inductance value, a differential mode magnetic flux passes through the top part, the second lateral branch, the bottom part, and the first lateral branch, and a common mode magnetic flux circulates through each of the first lateral branch and the second lateral branch, toward the central branch by passing through the top part and the bottom part, and the first coil and the second coil is arranged to uncouple a common mode inductance value from a differential mode inductance value.

2. The differential mode and common mode choke according to claim 1, wherein the first lateral branch and the second lateral branch are manufactured by stacking magnetic plates.

3. The differential mode and common mode choke according to claim 1, wherein the first lateral branch and the second lateral branch are manufactured by machining or casting magnetic material.

4. The differential mode and common mode choke according to claim 1, wherein the central branch is manufactured by stacking magnetic plates.

5. The differential mode and common mode choke according to claim 1, wherein the central branch is manufactured by machining or casting magnetic material.

6. The differential mode and common mode choke according to claim 1, wherein the top part and the bottom part are manufactured by stacking magnetic plates.

7. The differential mode and common mode choke according to claim 1, wherein the top part and the bottom part are manufactured by machining or casting magnetic material.

8. The differential mode and common mode choke according to claim 1, wherein the first lateral branch, the second lateral branch, and the central branch are independent in relation to the top part and the bottom part.

9. A power converter intended to be connected to an electrical load and comprising:

a DC power supply bus provided with a first power supply line and a second power supply line;

a bus capacitor connected to the first power supply line and to the second power supply line and intended to keep a DC voltage constant on the DC power supply bus;

an inverter connected to the DC power supply bus, downstream of the bus capacitor, and intended to convert the DC voltage into a variable voltage to be applied to the electrical load; and a differential mode and common mode choke including
a ferromagnetic core comprising three branches extending between a bottom part and a top part, said three branches comprising a first lateral branch, a second lateral branch, and a central branch,
a first coil wound around the first lateral branch, and
a second coil wound around the second lateral branch,
wherein the first lateral branch is separated from the top part by a first air gap and from the bottom part by a second air gap, the second lateral branch is separated from the top part by a third air gap and from the bottom part by a fourth air gap, the central branch does not support a coil and is separated from the top part by a fifth air gap and from the bottom part by a sixth air gap, the first lateral branch and the second lateral branch are of a same size, and the central branch, which does not support a coil and which is separated from the top part by the fifth air gap and from the bottom part by the sixth air gap, is of a different size from the size of the first lateral branch and the second lateral branch, said first coil has a first inductance value, said second coil has a second inductance value, equal to the first inductance value, the first coil being connected in series to the first power supply line and the second coil being connected in series to the second power supply line, said first coil is wound around the first lateral branch and connected to the first power supply line so as to generate a first common mode magnetic flux in a given direction in the central branch and a first differential mode magnetic flux in a given direction in the central branch, said second coil is wound around the second lateral branch so as to generate a second common mode magnetic flux identical to the first common mode magnetic flux and circulating in the central branch, in the same direction as that of the first common mode magnetic flux, and a second differential mode magnetic flux in the central branch in a direction opposite to the direction of the first differential mode magnetic flux, creating a zero resultant differential mode flux in the central branch, and the first coil and the second coil is arranged to uncouple a common mode inductance value from a differential mode inductance value.

10. The power converter according to claim 9, wherein the first lateral branch and the second lateral branch are manufactured by machining or casting magnetic material, the central branch is manufactured by machining or casting magnetic material, and the top part and the bottom part are manufactured by machining or casting magnetic material.

* * * * *